United States Patent [19]
Thomson

[11] 3,746,415
[45] July 17, 1973

[54] SELF-LUBRICATING SLEEVE BEARING
[75] Inventor: John B. Thomson, Manhasset, N.Y.
[73] Assignee: Thomson Industries, Inc., Manhasset, N.Y.
[22] Filed: Aug. 5, 1971
[21] Appl. No.: 169,273

[52] U.S. Cl. ............... 308/240, 308/36.1, 308/238
[51] Int. Cl. ........................................... F16c 33/66
[58] Field of Search .................. 308/240, 36.1, 100, 308/108

[56] References Cited
UNITED STATES PATENTS
3,603,213  9/1971   Tootle .............................. 308/240
2,106,860  2/1938   Tibbetts ........................... 308/240
3,527,507  9/1970   Clark et al. ...................... 308/36.1
3,380,791  4/1968   Peck ................................ 308/240
3,210,137  10/1965  Williams .......................... 308/240

Primary Examiner—Charles J. Myhre
Assistant Examiner—Barry Grossman
Attorney—George B. Finnegan, Jr., John C. Vassil et al.

[57] ABSTRACT

A self-lubricating sleeve bearing is formed from a moldable plastic material as a thin-walled cylindrical member hasing a bearing surface on the inside bore thereof and a plurality of circumferentially extending thin-walled fins located along the outside surface thereof. A plurality of separate lubrication distribution openings provided in the cylindrical member between the circumferentially extending fins or, alternatively, a plurality of axially-extending slots interconnecting two or more of the fins, meter the lubricant to the bearing surface. Lubricant equalization apertures provided in the circumferentially extending fins interconnect the lubricant-carrying annular spaces therebetween throughout the length of the bearing. The bearing may be assembled from sections or modular segments. Integral and/or separate sealing can be incorporated with the bearing. The bearing also may be manufactured with a longitudinally extending compensation gap to permit circumferential expansion of the bearing under operating conditions.

17 Claims, 11 Drawing Figures

PATENTED JUL 17 1973

INVENTOR.
JOHN B. THOMSON
BY
Morgan, Finnegan, Durham & Pine
ATTORNEYS

INVENTOR.
JOHN B. THOMSON
BY
Morgan, Finnegan, Durham & Pine
ATTORNEYS

SELF-LUBRICATING SLEEVE BEARING

BACKGROUND AND OBJECTS OF THE INVENTION

The present invention relates generally to self-lubricating bearings, and relates more particularly to certain new and useful improvements in the construction of a self-lubricating sleeve bearing which may be manufactured at low cost while increasing bearing life and permitting operation at higher speeds and greater loads than were possible with previously known self-lubricating bearings. As will become evident from the description of the invention, the invention has applicability to other types of bearings, such as rod end bearings and ball joints. However, as sleeve bearings comprise the vast majority of plain, i.e. non-ball bearings, the description of the invention and the drawings forming a part thereof, illustratively will be with reference to sleeve bearing constructions. However, it should be understood that the advantages and beneficial results attainable by the present invention are applicable to such other constructions as rod end and ball joint bearings.

Lubricated sleeve bearings continually lose a certain amount of lubricant through the clearance between the bearing bore and the diameter of the mating shaft, and also from oxidation or evaporation of the more volatile elements of the lubricant. For this reason, load, speed of operation and bearing life are largely governed by the total lubricating capacity of the bearing and the per cent of utilization of the lubricant between the bearing bore and the surface of the mating shaft.

Previously known lubricating sleeve bearings have been disadvantageous in regard to the foregoing parameters in that they have either had relatively small lubricant capacity or have exhausted the supply of lubricant in the areas of heaviest loading while leaving excess lubricant in other portions of the bearing.

Previously known lubricant sleeve bearings have been disadvantageous for the additional reason that they have been manufactured from metal, resulting in a high cost of prqduction due to the machining required in order to form the lubricant storage chambers and distribution openings. Also in this connection, in previous applications for sleeve bearings requiring close tolerances, the procedure has been to install the bearing in the housing and to thereafter ream or otherwise finally size the bearing bore in order to compensate for manufacturing tolerances and out-of-roundness. This required secondary operation with metal bearings further increases their manufacturing expense.

It is therefore an object of the present invention to provide a new and improved self-lubricating bearing.

Another object of this invention is to provide a new and improved self-lubricating sleeve bearing.

Another object of this invention is to provide a new and improved self-lubricating sleeve bearing which is capable of longer life and operation at higher speeds and greater loads than is possible with previously known bearing constructions.

Another object of this invention is to provide a new and improved self-lubricating sleeve bearing which may be manufactured at very low cost from moldable materials, either in one integral piece or in snap-fitting sections and modular integral segments.

Another object of this invention is to provide a new and improved self-lubricating sleeve bearing having reduced noise and vibration characteristics.

Another object of this invention is to provide a new and improved self-lubricating sleeve bearing which obtains a high percentage of utilization of the lubricant carried in the bearing.

Another object of this invention is to provide a new and improved self-lubricating sleeve bearing having sufficient flexibility and resilience to permit the bearing surface thereof to conform to the surface of the rotating shaft about which it is mounted.

Another object of this invention is to provide a new and improved self-lubricating sleeve bearing which self-sizes itself to slight misalignments between the bearing surface thereof and the mating rotating shaft caused by manufacturing tolerances and out-of-roundness, thereby eliminating the final sizing operation required with previously known bearing constructions.

Another object of this invention is to provide a new and improved self-lubricating sleeve bearing which permits the incorporation of integral or separate sealing means to retard the loss of the loss of lubricant and inclusion of ambient contamination.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the self-lubricating sleeve bearing of the present invention comprises a thin-walled cylindrical member having a bearing surface on the inside bore thereof and a plurality of circumferentially extending thin-walled fins spaced along the outside surface thereof. As preferably embodied, a plurality of lubrication distribution openings provided in the cylindrical member in the annular spaces between each of the circumferentially extending fins meter the lubricant to the bearing surface. Lubricant equalization apertures provided on the peripheral surface of the circumferentially extending fins interconnect the lubricant-carrying annular spaces therebetween throughout the length of the bearing.

Advantageously, and as preferably embodied, the sleeve bearing of the present invention is formed from a moldable material, such as a resilient plastic, by commercially available high speed multiple cavity injection molding equipment. The sleeve bearing may also advantageously be molded in generally semi- or quarter-cylindrical sections which are adapted to snap-fit together to form the sleeve, or from individual integral modular segments which snap-fit together to attain the desired length of bearing.

Also advantageously, the sleeve bearing may include a flange on at least one end thereof providing axial positioning of the bearing and also permitting its usage under thrust loads.

In other modified embodiments of the sleeve bearing of the present invention, there are provided integral, inwardly tapered, flexible sealing rims at the ends thereof and/or separate O-ring seals at the ends. The lubricant distribution openings may advantageously comprise slots extending axially along the bearing surface of the cylindrical member, serving as communication passages for the annular spaces between two or more circumferentially extending fins, providing additional lubricant distribution capability.

Finally, the bearing may alternatively be manufactured with a longitudinally extending compensation gap to permit full circumferential expansion during operating conditions, without cramping.

It will be apparent from the foregoing general description that the objects of the invention specifically ennumerated herein are accomplished by the invention as here embodied.

It has been found that a sleeve bearing may be constructed in which the total bearing load and the thin-walled cylindrical bearing surface can be supported by a plurality of thin-walled circumferentially extending fins, and thus all of the radially extending area contained in the annular spaces between the fins is available for lubricant storage.

It has also been found that the lubricant equalization slots formed on the peripheral surface of the circumferentially extending fins permit the lubricant to flow from one annular space to the next. No bearing is entirely perfectly aligned and uniformly loaded due to manufacturing tolerances. As a result, it is inevitable that one end of the bearing will be more heavily loaded than the other end and will therefore generate more frictional heat which in turn calls for and creates additional flow of lubricant. With the construction of the present invention the lubricant freely flows to where it is needed most and, consequently, nearly all of the lubricant in all of the annular spaces is utilized before the bearing fails.

By providing a plurality of lubricant distribution holes or interconnecting distribution slots around the circumference of the bearing sleeve in each of the annular spaces formed by the circumferentially extending fins, very little lubricant is left in the bottom of the bearing when the supply of lubricant to the rotating shaft is exhausted.

Self-lubricating sleeve bearings embodying the foregoing constructional features are vastly improved over previously known constructions both in total lubricant capacity and per cent of utilization of available lubricant and, consequently, have been found to be vastly improved in load, speed of operation and bearing life.

In addition, the "thin-wall/thin fin" construction of the sleeve bearing of the present invention can be manufactured at very low cost as compared to the production cost of metal bearings, either in one integral piece or in sections which may be snap-fitted together, from moldable materials with high speed multiple cavity injection molding equipment.

A further advantage of constructing a self-lubricating sleeve bearing with a thin-walled bearing surface supported by a plurality of circumferentially extending thin-walled fins is that it provides the bearing with sufficient flexibility to permit the bearing surface to conform to the surface of the mating shaft, thereby increasing the wear resistance area of the bearing surface and, hence, further increasing the life of the bearing.

The resilience of the bearing construction of the present invention has the further advantage of eliminating pounding and of absorbing vibration due to the damping effect of the structure. Consequently, the bearing of the present invention is much quieter than previously known self-lubricating bearing constructions. In addition, where constructed of a moldable material such as nylon, or materials equivalent thereto, further vibration and pounding is absorbed due to the inherent characteristics of such materials.

A further advantage of a bearing constructed in accordance with the present invention is that it is self-sizing, and therefore eliminates the secondary final sizing operation frequently required with metal bearings. Thus, the structure's resilience permits the bearing to be installed with a small interference fit between the rotating shaft diameter and the diameter of the bearing bore without undue concentration of bearing pressures and the lubricant equalization slots permit the lubricant to be automatically supplied to the area of highest bearing load concentration which generates excessive heat until additional lubrication arrives. Thus, the bearing wears at a controlled rate under controlled lubrication until it achieves a near perfect fit with the mating rotating shaft.

Another advantage of the bearing construction of the present invention is that it is possible to incorporate integral sealing to retard the loss of lubricant and the inclusion of ambient contamination. Thus, the ends of the bearing sleeve may be formed with a slightly inwardly tapered lip or rim which engages the rotating mating shaft. Of course, separate seals such as O-rings may also be included where the rotating shaft is vertically oriented or where severe operating conditions are experienced.

It will be understood that the foregoing general description and the following detailed description as well are exemplary and explanatory of the invention but are not restrictive thereof.

The accompanying drawings, referred to herein and constituting a part thereof, illustrate preferred embodiments of the invention, and together with the description, serve to explain the principles of the invention.

DESCRIPTION OF THE PREFERRED EMBODIMENTS

Figure 1:
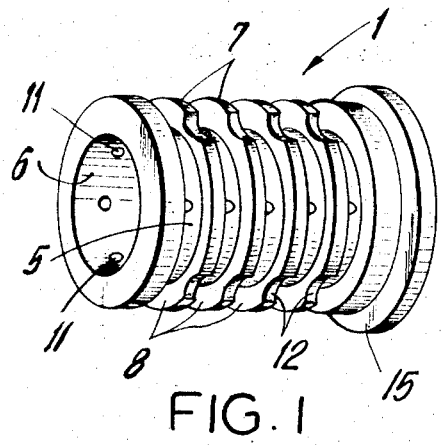
FIG. 1 is a view in perspective of a self-lubricating sleeve bearing constructed in accordance with the present invention.
Figure 2:
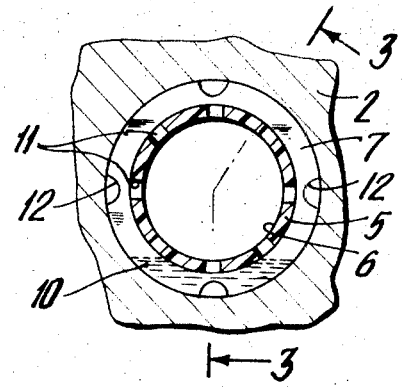
FIG. 2 is a cross-sectional view of the bearing construction of FIG. 1, illustrating the bearing mounted in a housing and containing a minimum desired level of lubricant therein.
Figure 3:
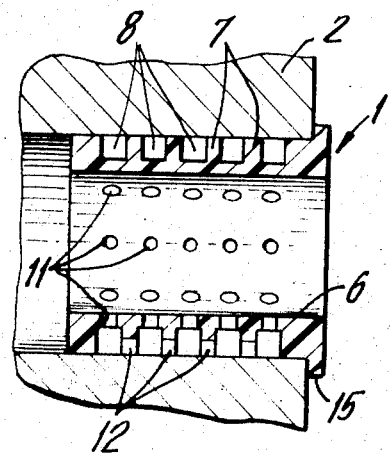
FIG. 3 is a longitudinal sectional view taken along line 3—3 of FIG. 2.
Figure 7:
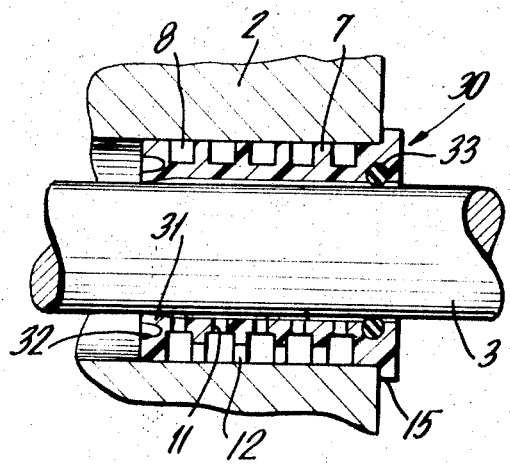
FIG. 7 is a longitudinal sectional view, partly in elevation, illustrating a first modified embodiment of the sleeve bearing of the invention illustrated in FIG. 1, the view showing the bearing mounted within a housing about a rotating shaft and illustrating an integral sealing rim at one end thereof and a separate O-ring seal at the other end.

Referring now more particularly to the embodiments of the invention shown in the accompanying drawings, there is illustrated in FIGS. 1-3 a self-lubricating sleeve bearing, indicated generally by reference numeral 1, adapted to be suitably mounted within a housing 2 and to journally support therewithin a rotating shaft 3 (see FIG. 7).

In accordance with the invention, sleeve bearing 1 is comprised of a thin-walled cylindrical member 5, whose inside bore 6 constitutes a bearing surface, the cylindrical member 5 being provided with a plurality of thin-walled fins 7 extending circumferentially about the outside surface of the cylindrical member in longitudinally spaced relationship so as to define a plurality of annular spaces 8 therebetween. Annular spaces 8 are adapted to contain a suitable lubricant 10, more fully described hereinafter. A plurality of lubrication distribution openings 11 extend through the cylindrical member 5 about the circumferentially extending surface thereof within each of the annular spaces 8, communicating the annular spaces with bearing surface 6. A plurality of lubricant equalization apertures 12 extend through each of the circumferentially extending fins 7, advantageously being provided on the peripheral surface thereof so as to provide communication passages between the lubricant-carrying annular spaces 8 throughout the length of the bearing.

Advantageously, and as here preferably embodied, sleeve bearing 1 is formed from a moldable material, such as a resilient plastic, with suitable commercially available high speed multiple cavity injection molding equipment. Examples of such materials which have been found to operate entirely satisfactorily are nylon and "DELRIN," of which the latter is commercially available from E. I. duPont de Nemours & Co., Wilmington, Del. Other moldable materials equivalent to Nylon and "DELRIN" will operate satisfactorily and will be apparent to those of ordinary skill in the art.

As previously mentioned herein it has been found that a thin-walled bearing surface and normal bearing loads can be supported by the aforedescribed plurality of thin-walled fins extending circumferentially about the backside of the bearing surface, leaving a large amount of annular space between the fins available for lubricant storage. It has also been found that moldable resilient plastics, such as Nylon and "DELRIN," and their equivalents, have sufficient strength and toughness to form a bearing constructed in the foregoing manner, resulting in substantial savings in production costs.

Lubricant 10 may be of any suitable type, such as oil or grease. A grease lubricant is generally preferred, and it is preferred that the grease lubricant have a viscosity such that it will remain in the annular spaces of the bearing at room temperature without requiring additional sealing. It will be understood that a grease should be utilized which will liquefy at moderately high temperatures which are generated by the friction between the rotating shaft (see FIG. 7) and the bearing bore 6, thus causing flow of lubricant through the distribution slots or holes 11 provided in the bearing sleeve 5. Also, the liquefication of the grease by bearing friction enables the lubricant to flow circumferentially in the annular storage spaces and to flow from one annular space to another through the equalization apertures 12, thus affording maximum utilization of the total lubricant capacity of the bearing. The lubricant may contain any of a number of additives such as anti-oxidants, load bearing agents, anti-galling agents, stabilizers and the other additives, such that the lubricant package is tailored to the demands of the application to which the bearing is put.

Figure 9:
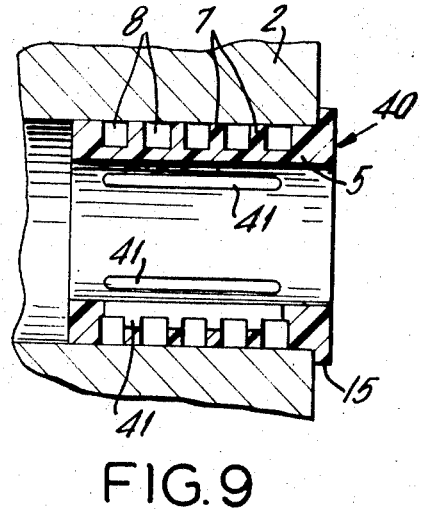
FIG. 9 is a longitudinal sectional view taken along line 9—9 of FIG. 8.

It will be understood that the dimensions of the lubricant distribution openings 11 may be of any suitable size in order to meter the flow of lubricant from the annular spaces to the bearing surface as desired at normal operating temperatures. It will also be apparent that the amount of lubricant 10 illustrated in FIGS. 2 and 9 is at the minimum level and that it is only this amount of lubricant which will remain upon the bearing reaching its point of failure.

Advantageously, one end of sleeve bearing 1 is provided with a flange 15 so as to permit axial positioning of the bearing and to also permit its usage with axially-directed thrust loads.

Figure 4:
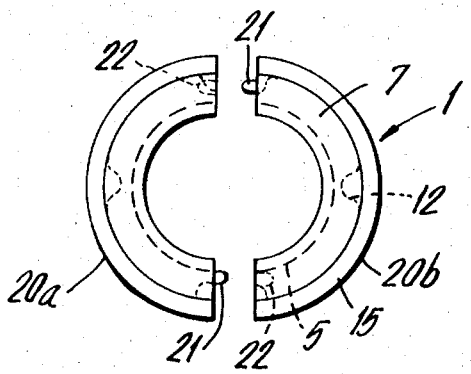
FIG. 4 is a view in end elevation of the sleeve bearing illustrated in FIG. 1, the view showing the bearing being formed from two generally semi-cylindrical sections.
Figure 5:
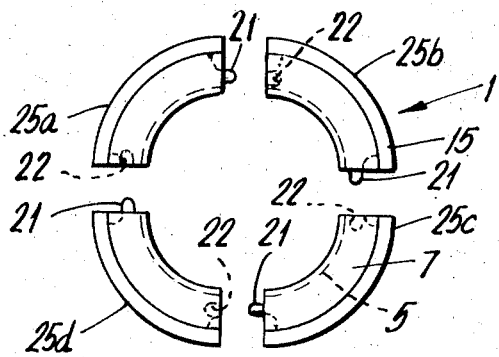
FIG. 5 is a view in end elevation of the sleeve bearing illustrated in FIG. 1, the view showing the bearing formed from four generally quarter-cylindrical sections.
Figure 6:
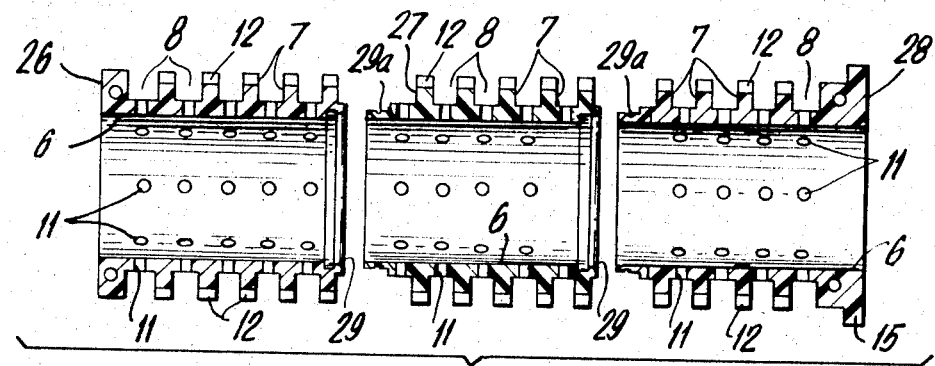
FIG. 6 is a view in side elevation, partly in section, illustrating a sleeve bearing constructed as shown in FIG. 1, the length of the bearing being formed from a plurality of integral sleeve segments adapted to snap-fit into a single elongated sleeve bearing.

Referring now more particularly to FIGS. 4-6 of the accompanying drawings, there is illustrated several different techniques by which the bearing may be manufactured, which are particularly useful when the bearing is manufactured from moldable materials.

Thus, in FIG. 4, there is illustrated a bearing unit which is manufactured in two generally semi-cylindrical half-sections 20a, 20b, each of which includes one or more tabs and oppositely directed mating recesses 21, 22, respectively, for snap-fit assembly. The same principle applies in FIG. 5, except that the bearing unit is manufactured in four generally quarter-cylindrical quarter-sections 25a, 25b, 25c, 25d.

FIG. 6 illustrates a series of modular segments 26, 27, 28, respectively, each of which may be provided with either a circumferentially extending bead 29 or mating groove 29a, the intermediate modular segment 27 having one of each on opposite ends thereof. It will be understood that by manufacturing the modular segments 26, 27, 28 a bearing unit of any desired length is provided by using either of the segments alone or by simply snap-fitting together modules 26 and 28, or all of the modules 26, 27 and 28, or a plurality of modules 27 between modules 26 and 28.

Referring now more particularly to FIG. 7 of the accompanying drawings, there is illustrated a first modified embodiment of the invention, designated generally by reference numeral 30, wherein one end of the bearing cylindrical wall 5 is provided with an integrally formed, circumferentially extending, inwardly tapered rim 31 and the end wall is annularly grooved at 32 to provide added flexure to rim 31. Advantageously, the opposite end of bearing 30 is suitably grooved to include a separate seal, such as O-ring 33. It will be seen that integral sealing rim 31 retards the loss of lubricant and the inclusion of ambient contamination and that the separate O-ring seals may be desirable where shaft 3 is vertically oriented or where severe operating conditions are encountered.

Figure 8:
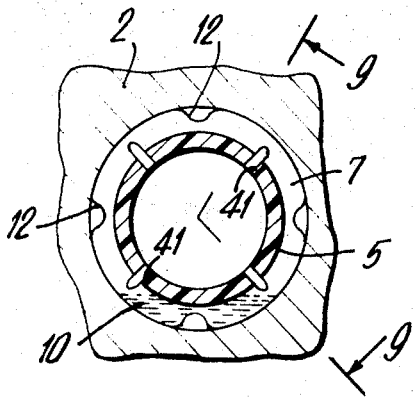
FIG. 8 is a cross-sectional view of a second modified embodiment of the sleeve bearing of the invention illustrated in FIG. 1, the view illustrating a plurality of axially extending slots constituting the lubricant distribution openings of the bearing.
Figure 8A:
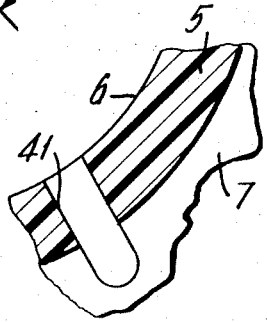
FIG. 8A is an enlarged, fragmentary, cross-sectional view, partly in elevation, of a portion of the bearing wall illustrated in FIG. 8.

Referring now more particularly to FIGS. 8, 8A and 9 of the accompanying drawings, there is illustrated a second modified embodiment of a sleeve bearing constructed in accordance with the invention, designated generally by reference numeral 40. In this embodiment, the lubricant distribution openings extending through the cylindrical member 5 are comprised of a plurality of axially extending slots 41 which interconnect a plurality of the annular spaces 12 with bearing surface 6. It will be seen that the construction of this embodiment of the invention enhances the lubricant distribution capability of the bearing.

Figure 10:
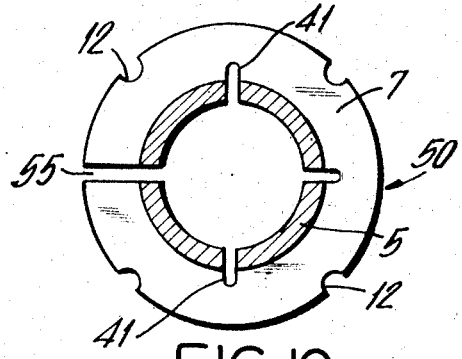
FIG. 10 is a cross-sectional view of a third modified embodiment of the sleeve bearing of the invention illustrated in FIG. 1, having lubricant distribution slots and a compensation gap.

Referring now more particularly to FIG. 10 of the accompanying drawings, there is illustrated a third modified embodiment of a sleeve bearing constructed in accordance with the invention, designed generally by reference numeral 50. In this embodiment, sleeve bearing 50 is split longitudinally from end to end to form a compensation gap 55 of sufficient width to permit the sleeve to expand freely in a circumferential direction, under operating conditions, without cramping. Advantageously, gap 55 is of sufficient width to prevent the edges thereof from having pressure contact with each other during use. While the sleeve bearing 50 is illustrated with lubricant distribution openings in the form of slots 41, it will be understood that the lubricant distribution openings for this embodiment may equally well comprise holes 11.

It will be readily appreciated that the invention is also applicable to rod end and ball joint bearing constructions. For example, the ball or spherical portion of such bearings will be provided with a bearing surface and supporting surface provided with thin-walled fins with the spaces between the fins serving to contain the lubricant. Suitable openings to permit communication between the lubricant containing spaces of the ball and the bearing surface can be provided, as can be equalization apertures, for supplying lubricant to the bearing surface as will be evident to the worker skilled in the art having regard to the foregoing detailed description of the invention given with respect to sleeve bearing constructions.

The invention in its broader aspects is thus not limited to the specific embodiments herein shown and described but departures may be made therefrom within the scope of the accompanying claims, without departing from the principles of the invention and without sacrificing its chief advantages.

What is claimed is:

1. A self-lubricating bearing comprising:
a thin-walled member having a bearing surface;
a plurality of thin-walled radially extending fins supporting the bearing surface
said radially extending fins defining a plurality of annular spaces therebetween for containing a lubricant; and
a plurality of openings extending through said member communicating said spaces between said fins with said bearing surface;
whereby, lubricant contained in said spaces may flow from said spaces through said openings to said bearing surface of said thin-walled member.

2. The self-lubricating bearing of claim 1, wherein;
a plurality of apertures extend through said fins communicating said annular spaces with one another;
whereby lubricant contained in said spaces may flow between said annular spaces.

3. The self-lubricating bearing of claim 1, formed from a moldable material.

4. The self-lubricating bearing of claim 1, formed into a single unit from two or more sections.

5. A self-lubricating sleeve bearing comprising:
a thin-walled member having a bearing surface on the inner surface thereof;
a plurality of thin-walled radially extending fins supporting the bearing surface of said member,
said radially extending fins defining a plurality of annular spaces therebetween for containing a lubricant;
a plurality of openings extending through said member communicating said spaces between said fins with said bearing surface;
whereby, lubricant contained in said spaces may flow from said spaces through said openings to said bearing surface.

6. The self-lubricating sleeve bearing of claim 5, wherein:
a plurality of apertures extend through said fins communicating said annular spaces with one another;
whereby, lubricant contained in said spaces may flow between said annular spaces and from said spaces to said bearing surface.

7. A self-lubricating bearing comprising:
a thin-walled member having a bearing surface on the inner surface thereof;
a plurality of thin-walled radially extending fins spaced on the outer surface of said member to support the bearing surface of said member,
said radially extending fins defining a plurality of spaces therebetween for containing a lubricant;
a plurality of openings extending through said member communicating said spaces between said fins with said bearing surface; a plurality of apertures extending through each of said fins communicating said annular spaces with one another;
whereby, lubricant contained in said spaces may flow between said spaces and from said spaces to said bearing surface.

8. A self-lubricant sleeve bearing in accordance with claim 7, in which
the thin-walled member is cylindrical and in which the bearing surface comprises the inner surface thereof; and
said spaces between the radially extending fins are annular spaces.

9. A bearing as claimed in claim 8, wherein said openings extending through said cylindrical member are of a predetermined dimension so as to meter the flow of lubricant from said annular spaces to said bearing surface as desired under normal operating temperatures.

10. A bearing as claimed in claim 8, formed into a single unit from two or more sections.

11. A bearing as claimed in claim 8, formed into a single unit of desired length from two or more modular segments.

12. A bearing as claimed in claim 8, including a flange formed on at least one end thereof.

13. A bearing as claimed in claim 8, wherein said cylindrical member includes an integrally formed, circumferentially extending, inwardly tapered, flexible rim on at least one end thereof so as to integrally seal said bearing about a rotating shaft extending through the inside bore thereof.

14. A bearing as claimed in claim 8, wherein said openings extending through said cylindrical member comprise a plurality of axially extending slots interconnecting a plurality of said annular spaces with said bearing surface.

15. A bearing as claimed in claim 8, including a longitudinally extending compensation gap of sufficient width to permit free circumferential expansion of said sleeve in use.

16. A bearing as claimed in claim 3, wherein said moldable material is a resilient or rigid plastic.

17. A bearing as claimed in claim 13, including means for sealing said bearing about a rotating shaft separately from said integral sealing rim.

* * * * *